United States Patent [19]
Neil

[11] Patent Number: 5,920,426
[45] Date of Patent: Jul. 6, 1999

[54] TELESCOPIC VIEWFINDER OPTICAL SYSTEM

[75] Inventor: Iain A. Neil, Calabasas, Calif.

[73] Assignee: Panavision, Inc., Woodland Hills, Calif.

[21] Appl. No.: 08/974,933

[22] Filed: Nov. 20, 1997

[51] Int. Cl.$^6$ .......................... G02B 23/14; G03B 13/02; G03B 13/06

[52] U.S. Cl. .......................... 359/428; 396/382; 396/383; 396/384

[58] Field of Search .................. 356/8, 256; 359/362, 359/379, 381, 405, 406, 422, 423, 425, 431, 434, 506, 672, 678, 836, 837; 396/383, 384, 382

[56] References Cited

U.S. PATENT DOCUMENTS

| | | | |
|---|---|---|---|
| 3,913,116 | 10/1975 | Kastner et al. | 354/223 |
| 4,040,587 | 8/1977 | Gottschalk | 248/165 |
| 4,118,720 | 10/1978 | Gottschalk | 354/81 |
| 4,705,374 | 11/1987 | Robings | 354/225 |
| 5,130,845 | 7/1992 | Ruben | 359/428 |

*Primary Examiner*—Georgia Epps
*Assistant Examiner*—David N. Spector
*Attorney, Agent, or Firm*—Lyon & Lyon LLP

[57] ABSTRACT

A variable length telescoping viewfinder for cameras that provides a variably adjustable eye viewing distance relative to the camera without changing the focus or magnification of the scene being photographed throughout the telescoping movement of the viewfinder. The light rays of the real image supplied to the viewfinder directly or indirectly from the camera are passed through a field lens, Pechan prism, relay lens system forming collimated light rays from the fixed front module to the movable rear module wherein lens elements form an intermediate image that is viewed through an eyepiece lens group. The front module is weakly powered and of a substantial effective optical length because of the inclusion of the Pechan prism. The image forming lens group of the rear module is weakly powered whereby relative telescopic movement between the front and rear modules does not adversely affect the location, focus or magnification of the intermediate image throughout the range of movement. A magnification lens group is provided for selectively magnifying the intermediate image by moving the magnification lens group into and off the optical axis. The Pechan prism also allows proper orientation of the image. The eyepiece lens group may include a movable lens subgroup for precise focusing.

27 Claims, 15 Drawing Sheets

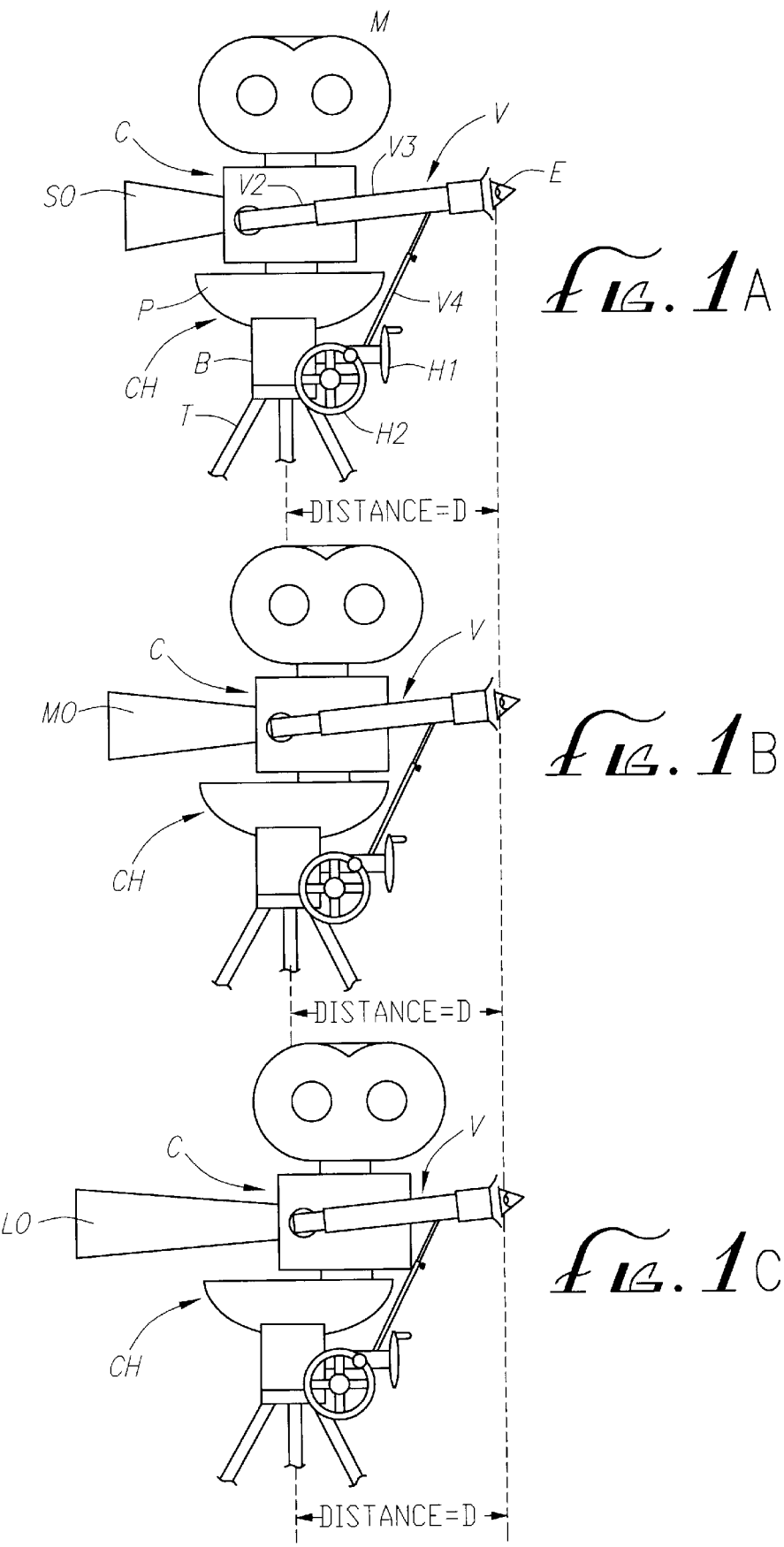

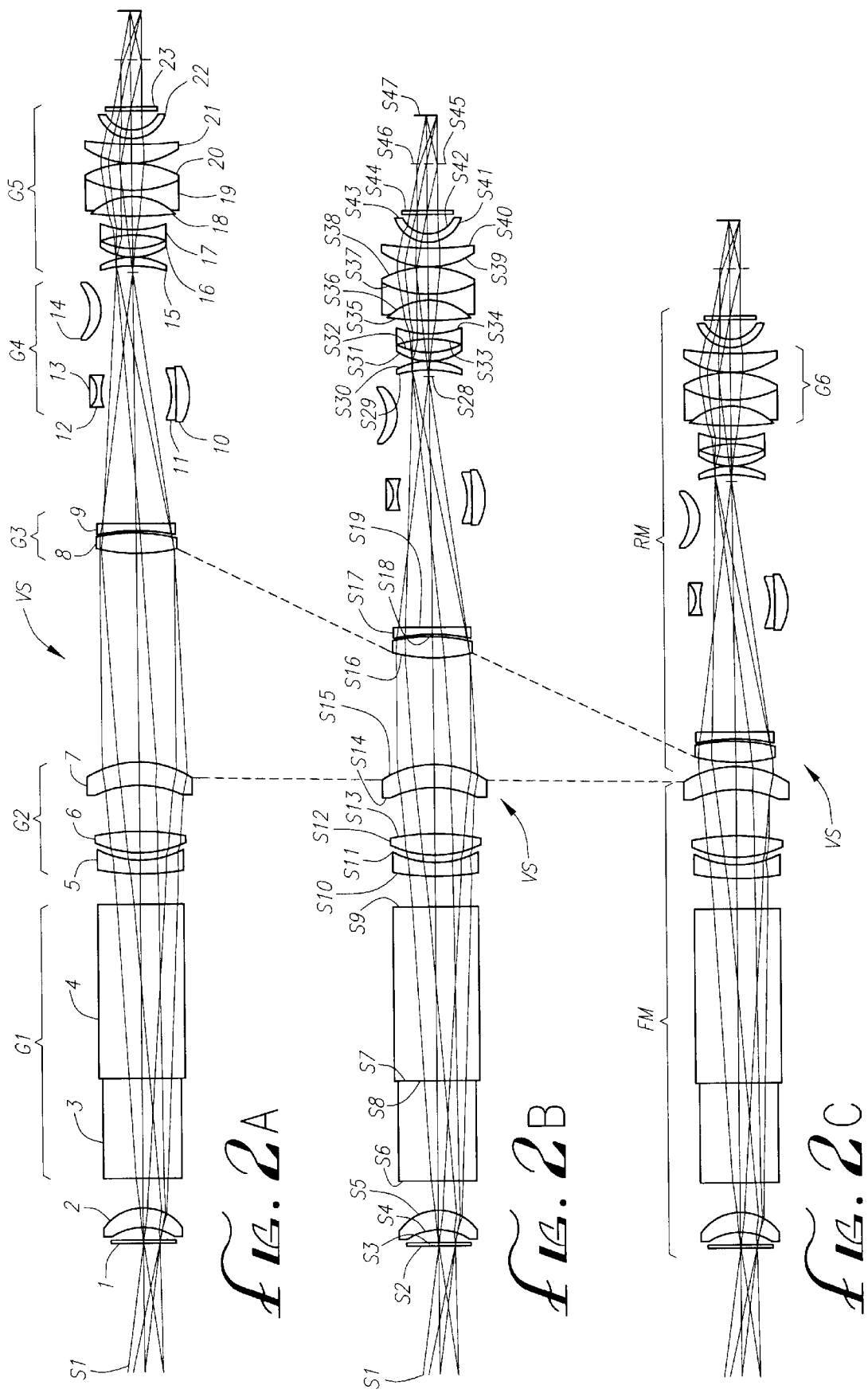

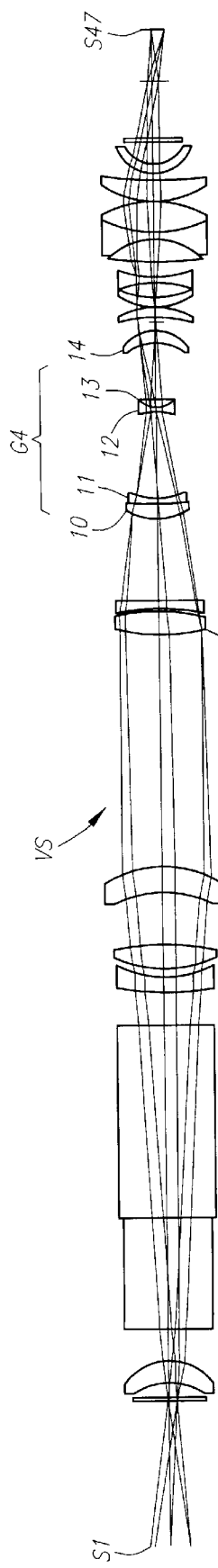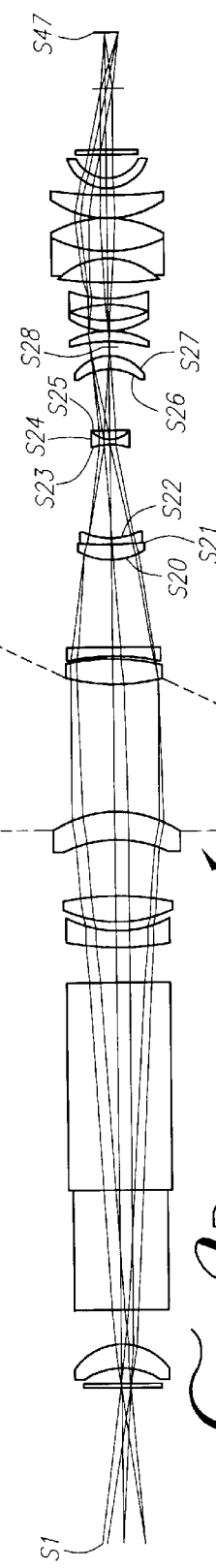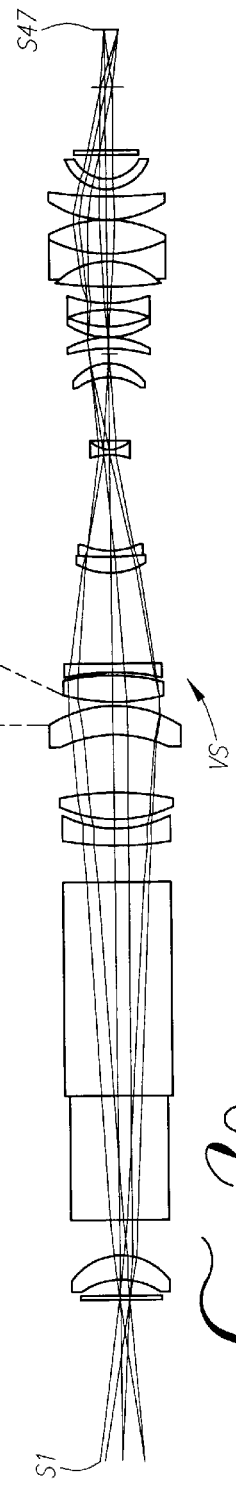

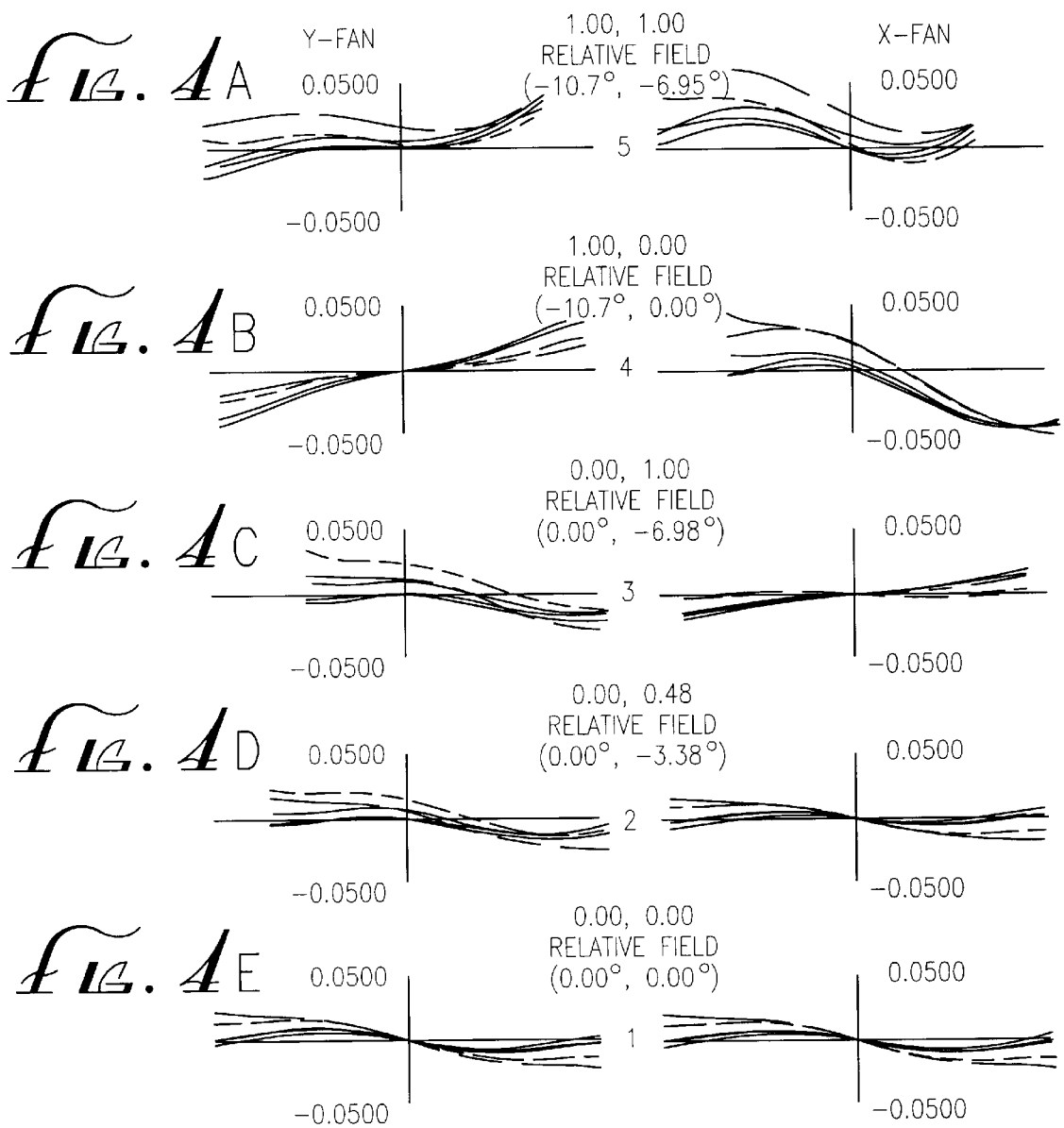

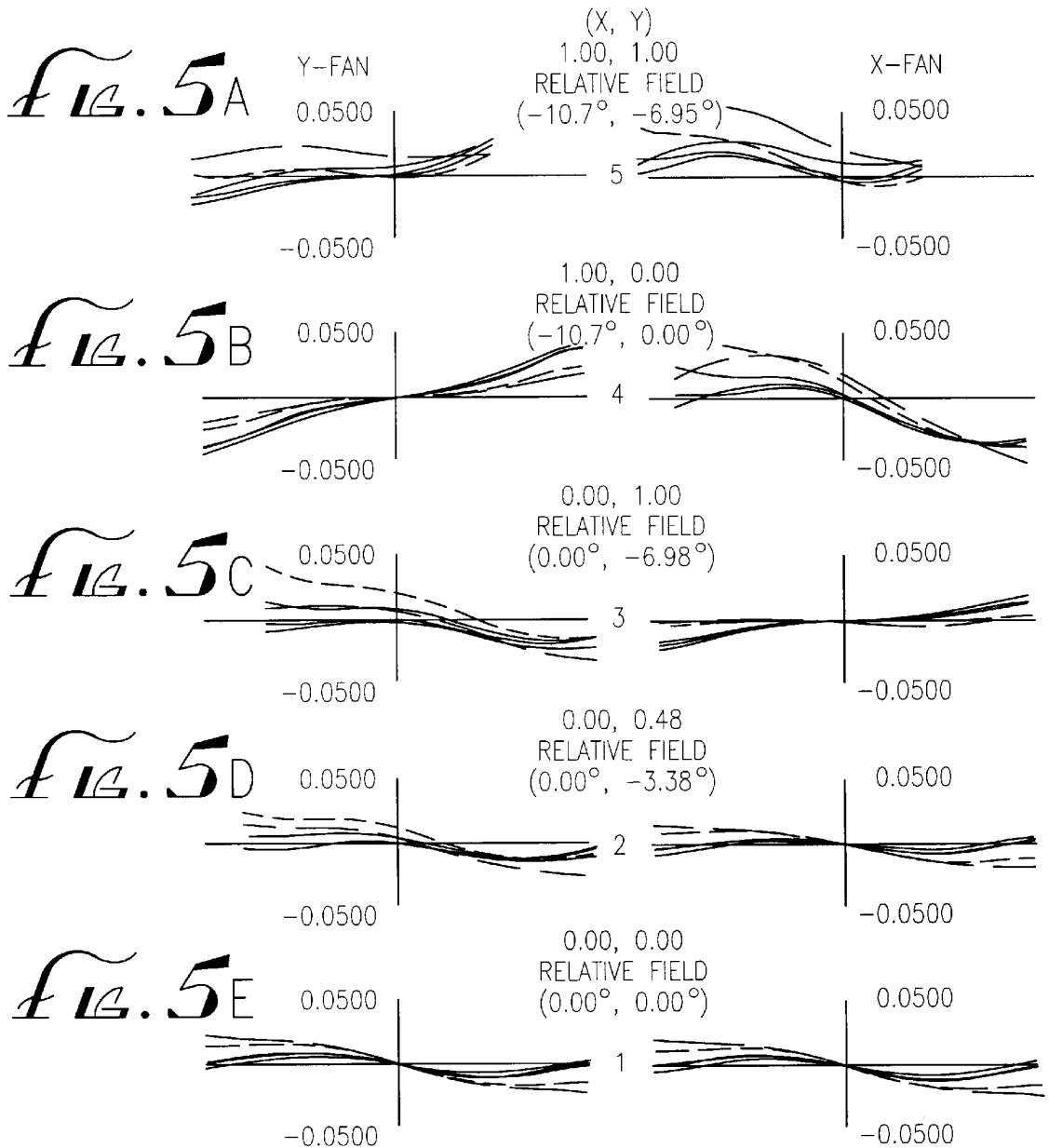

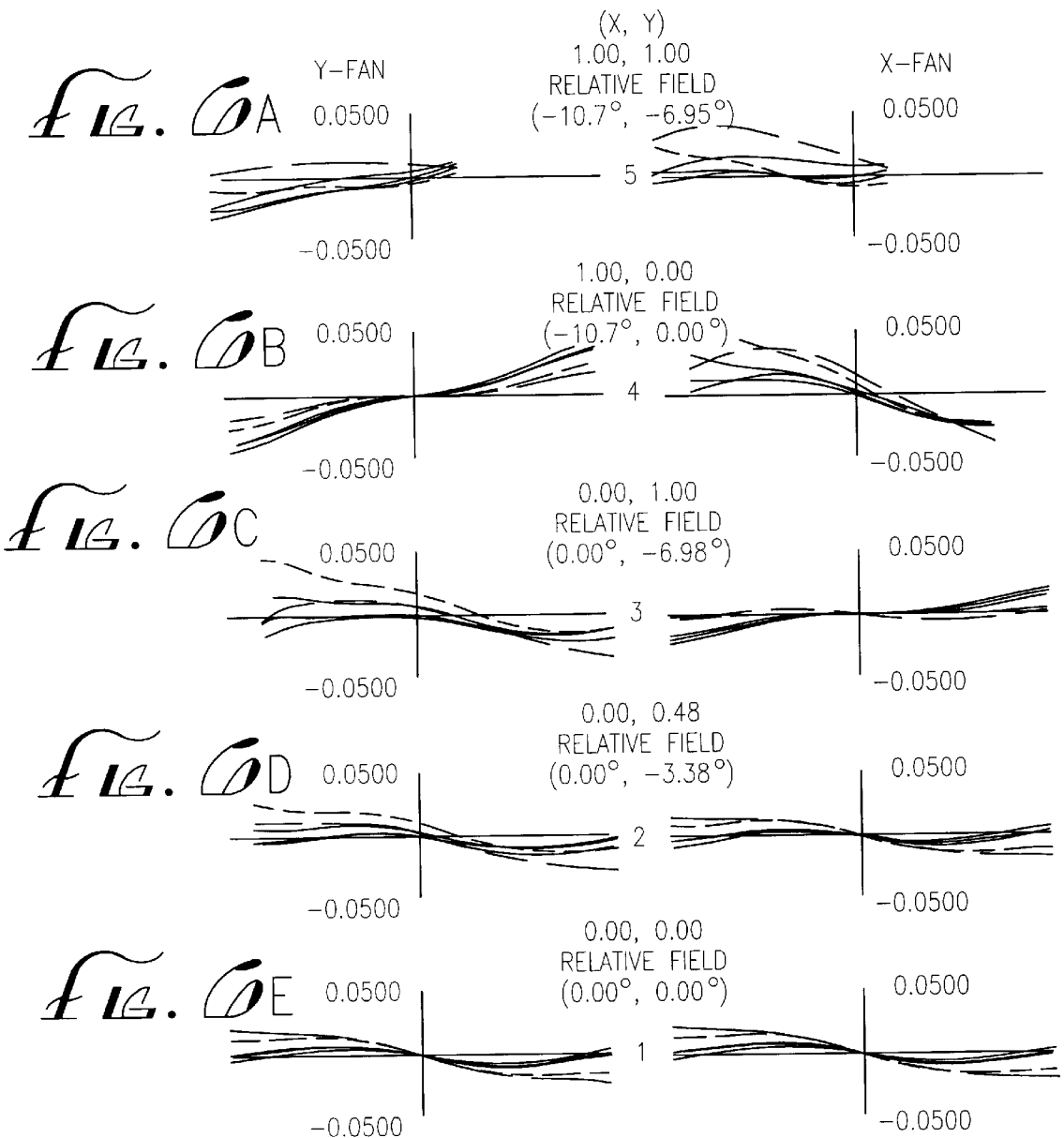

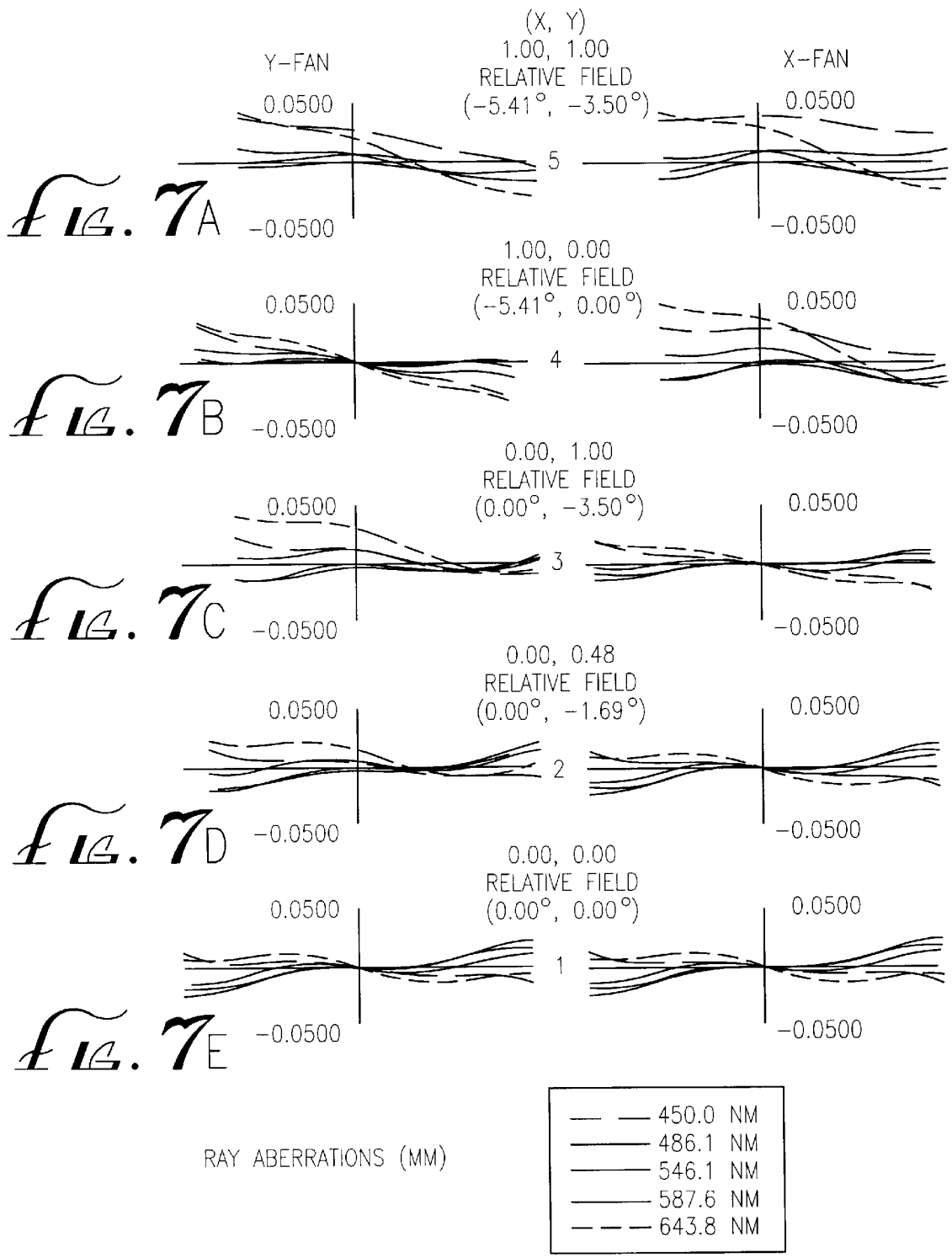

RAY ABERRATIONS (MM)

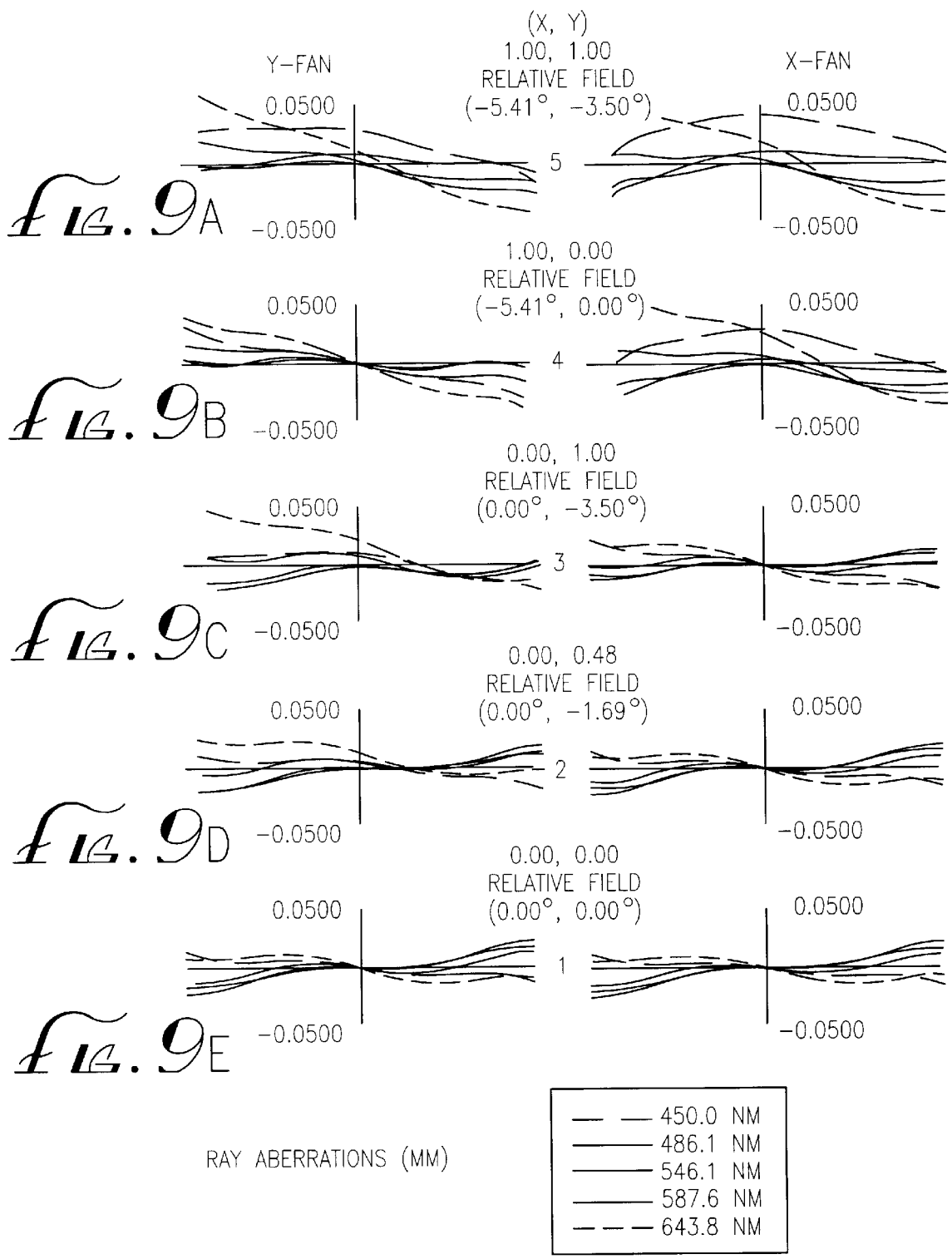

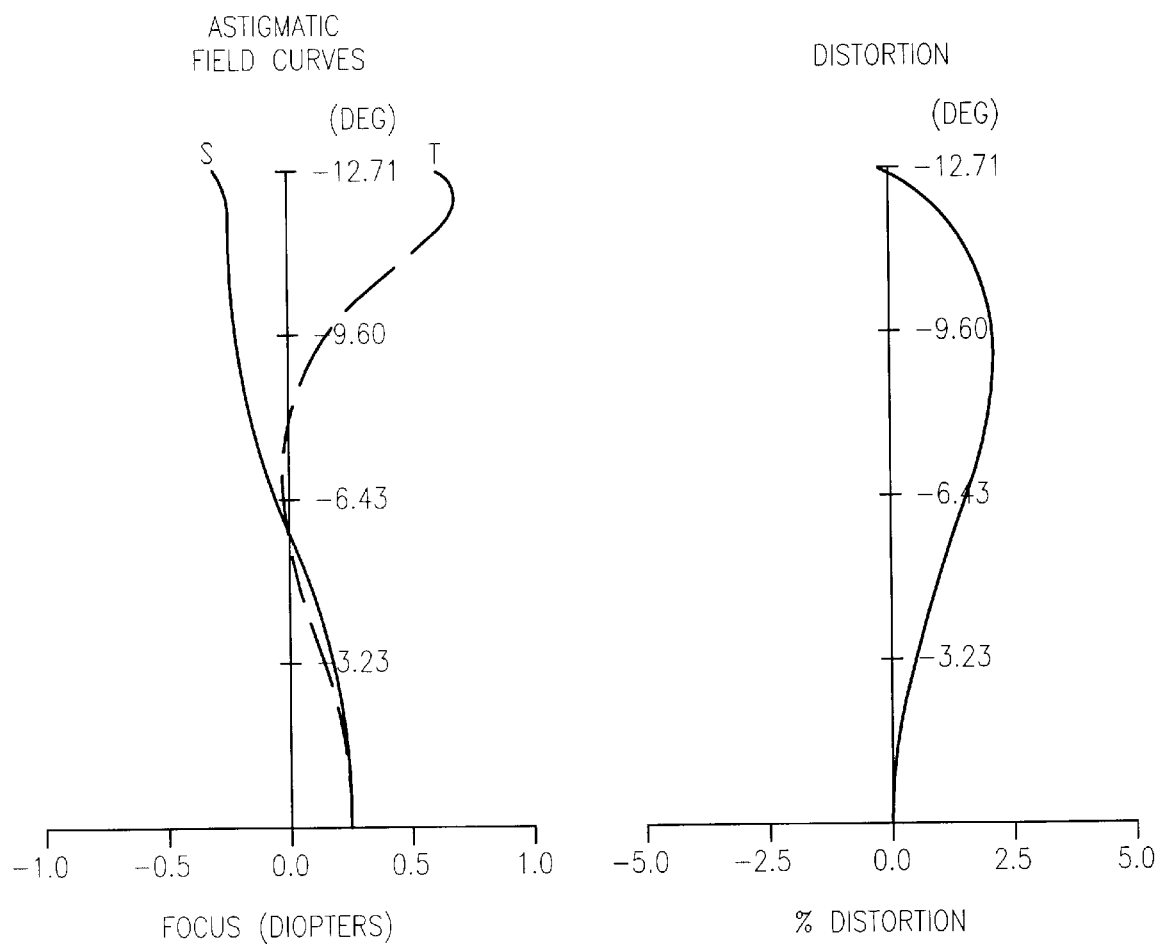

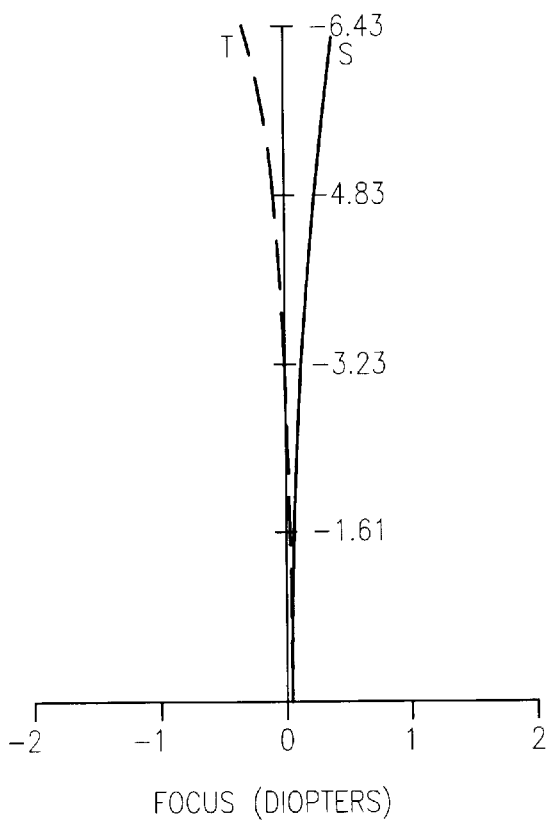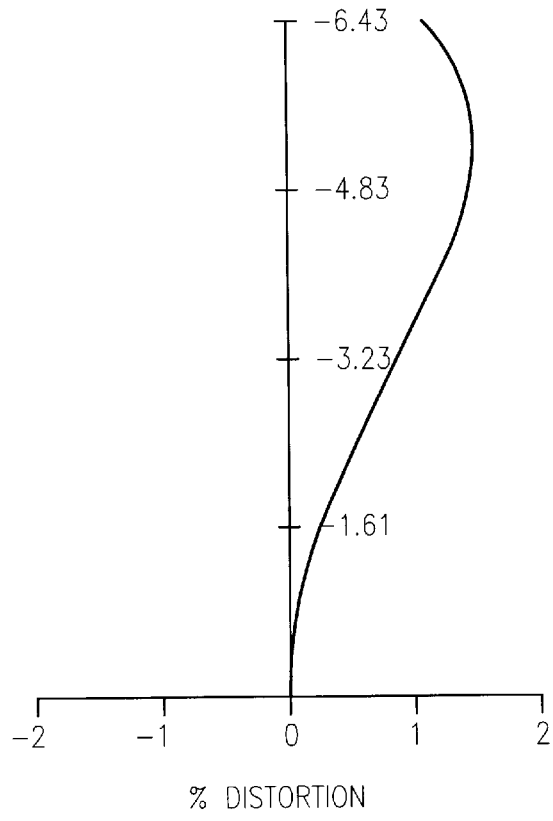

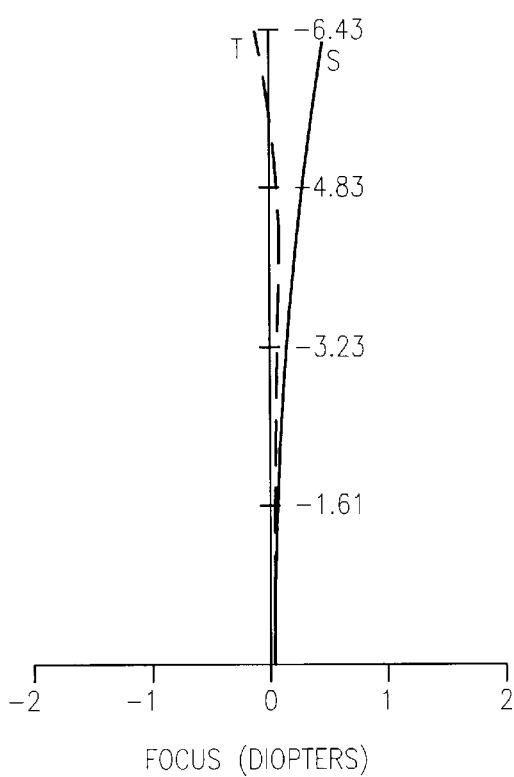
_FIG.14_A
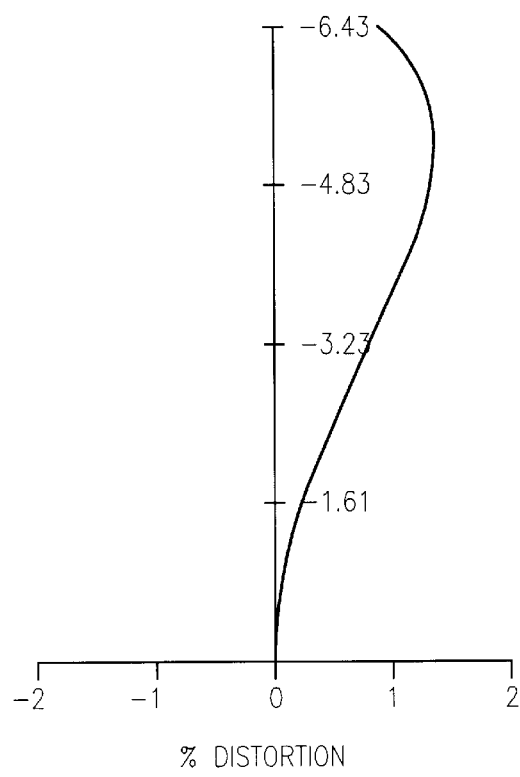
_FIG.14_B

TELESCOPIC VIEWFINDER OPTICAL SYSTEM

BACKGROUND OF THE INVENTION

This invention relates to an optical viewfinder for a film camera, video camera or the like and, in particular, to an optical viewfinder that is capable of telescoping for the viewer to select a comfortable position relative to the camera and camera support.

In the filming of high quality movies, such as for theater viewing, and the video recording of high quality productions and the like, it has become increasingly more popular to use high performance zoom lens objective systems that have been developed in recent years. Normally, the film or video camera is mounted on a support structure (a so-called camera "head") which is manually manipulated to point the camera at an object and, for example, to pan and tilt the camera as the object moves. The camera support or head has one or more handles that are either moved in the desired direction, such as on a fluid head, or rotated to cause the camera movement through gears, belts, chains or the like, and such handles are manipulated by the cameraman while viewing through a viewfinder the scene that is being photographed. For the optimum performance by and comfort of the cameraman, there should be a spacial relationship between the cameraman's eye when it is positioned at the viewfinder and the handles of the head that the cameraman must operate to cause camera movement, and that desired spacial relationship may differ from cameraman to cameraman depending on physical characteristics and personal preferences. However, the camera and objective lens must be substantially balanced on the camera head for smooth operation and to avoid inadvertent tilting, whereby the camera head is provided with a means for adjusting the fore and aft position of the camera. The objective lens system, either a fixed focal length prime lens or a zoom lens, may vary in weight from about one pound to thirty pounds which greatly affects the fore and aft balanced position of the camera on the head and yet the handle or handles of the head for causing panning and tilting of the camera remain at the same location at the base of the head, whereby the relative positions of the camera and handles varies substantially as the weight of the objective lens system varies. In turn, the relative position of the cameraman's head when his eye is positioned on the eye cup of the viewfinder and the handles that the cameraman must operate also varies substantially, which can be uncomfortable and even detract from effective operation of the camera head by the cameraman.

Heretofore, the only solution to this problem of changing relative distances between the viewfinder eye cup and the handles of the head has been to make the viewfinder in two or more different fixed lengths, called extenders, that roughly approximate good eye viewing positions for the most popular objective lens systems that require different fore and aft positions on the camera head. However, multiple detachable viewfinders are an added expense to purchase or lease, comprise additional weight and bulk for the cameraman to transport, which is a substantial problem where filming in remote locations, and their fixed lengths do not always provide the optimal eye viewing position for all zoom lenses and cameramen.

SUMMARY OF THE INVENTION

It is an object of this invention to provide a variable length telescoping viewfinder for cameras that provides a variably adjustable eye viewing position for the cameraman and wherein the focus and magnification of the scene remain constant throughout the telescoping movement of the viewfinder. Specifically, the invention provides an optical system in a viewfinder that provides lens groups that create a real image in the viewfinder that remains in focus and at the same magnification throughout the longitudinal movement of the lens groups toward and away from each other during telescoping movement of the viewfinder. Further, the invention provides an eye viewing position, which is related to the exit pupil position and residual aberrations thereof, that is nearly constant in position with any variation being easily accommodated by a small adjustment in eye viewing position at the eye cup of the viewfinder.

Another object of this invention is to provide a telescoping viewfinder optical system with more than one independently selectable degree of magnification of the scene viewed by the eye in the viewfinder throughout the telescoping movement thereof while remaining in focus. Specifically, this invention provides a magnification lens group that is selectably movable into and out of the optical axis of the telescopic viewfinder for selectively changing the magnification.

A still further object of the present invention is to provide an internal focusing lens group that is selectively adjustable for accommodating different eye conditions of the viewer, such as, short and long sightedness (myopia and hypermetropia, respectively), without requiring movement of the eye cup or viewer's eye, in addition to the other features and objects of the invention.

Other and more detailed objects and features of this invention will appear from the description of the preferred embodiment and the accompanying drawings.

BRIEF DESCRIPTION OF THE DRAWINGS

FIGS. 1A, 1B and 1C are diagrammatic elevation views of a camera mounted on a camera head with varying sizes of objective lenses and illustrating the telescopic viewfinder optical system of the present invention;

FIGS. 2A, 2B and 2C are optical diagrams of the preferred embodiment of the telescopic viewfinder optical system of the present invention in three different positions of the telescopic movement;

FIGS. 3A, 3B and 3C are optical diagrams similar to FIGS. 2A, 2B and 2C, respectively, but show the magnification lens group positioned along the optical axis of the viewfinder;

FIGS. 4A–4E, 5A–5E and 6A–6E are ray aberration graphs illustrating the performance of the telescopic viewfinder optical system of this invention in the three positions shown in FIGS. 2A, 2B and 2C, respectively;

FIGS. 7A–7E, 8A–8E and 9A–9E are ray aberration graphs illustrating the performance of the telescopic viewfinder optical system of this invention in the three positions shown in FIGS. 3A, 3B and 3C, respectively;

FIGS. 10A and 10B are graphs of the astigmatism and distortion characteristics, respectively, for the telescopic viewfinder optical system of this invention in the position shown in FIG. 2A;

FIGS. 13A and 13B are graphs of the astigmatism and distortion characteristics, respectively, for the telescopic viewfinder optical system of this invention in the position shown in FIG. 3A;

FIGS. 14A and 14B are graphs of the astigmatism and distortion characteristics, respectively, for the telescopic viewfinder optical system of this invention in the position shown in FIG. 3B.

DESCRIPTION OF THE PREFERRED EMBODIMENT OF THE INVENTION

Figures 8A, 8B, 8C, 8D, 8E:
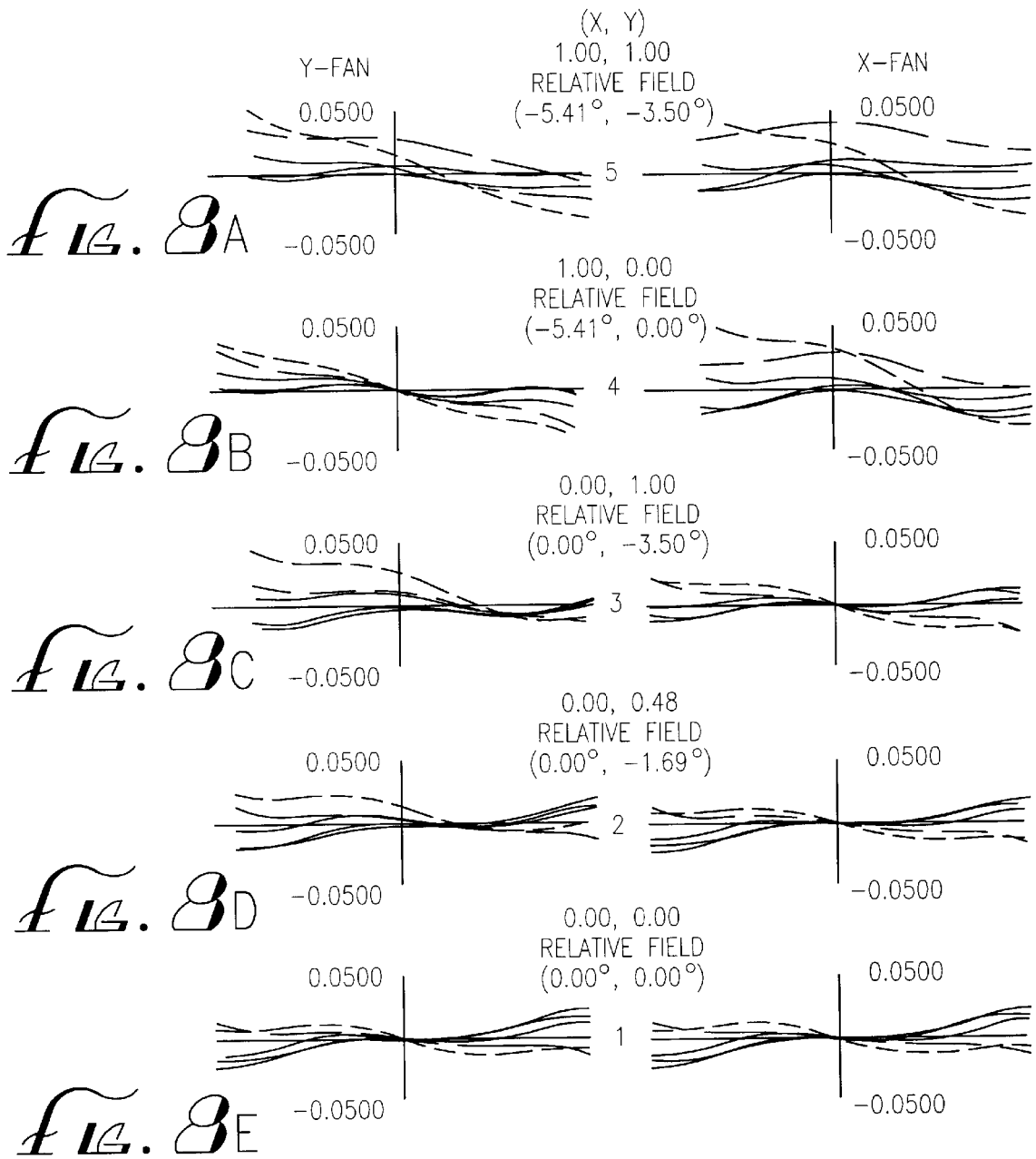

A preferred embodiment of the present invention will now be described by way of a specific lens design example with accompanying figures and tables, although it will readily appear to those skilled in the art that the specific lens design may be varied. FIGS. 1A, 1B and 1C diagrammatically illustrate the telescopic viewfinder assembly, generally designated V, of the present invention mounted on a movie camera C directly, as shown, or indirectly with other components interposed between the camera C and viewfinder assembly V pick-ups. In turn the camera C is mounted on a camera head CH in three different adjustable positions in the three Figures. The camera head CH may be of any conventional type, such as that shown in U.S. Pat. No. 4,040,587, the disclosure of which is incorporated herein as though fully set forth. FIG. 1A illustrates the camera C with a small sized objective lens SO which, for example, may be a small fixed focal length or a small high performance zoom lens weighing between about one to six pounds. FIG. 1B illustrates the camera C and head CH with a medium sized zoom lens MO weighing, for example, from ten to fifteen pounds. FIG. 1C illustrates the camera C and head CH with a large objective lens LO that may be a high performance zoom lens weighing, for example, from twenty to thirty pounds.

A comparison of FIGS. 1A–1C illustrates that the camera C is mounted at different fore and aft (right and left in the FIGS.) locations on the camera head CH. FIG. 1A illustrates the small objective lens SO and camera C, with all of the normal accessories attached thereto, such as the film magazine M, mounted near the center of the camera head CH to balance the camera C and its attachments on the camera head CH in view of the light-weight small objective lens SO. FIG. 1B illustrates the camera C mounted slightly to the rear of the center of the camera head CH for balancing the weight of the medium objective lens MO and camera C. Similarly, as illustrated in FIG. 1C, with the heavy large objective lens LO mounted on the camera C, the camera C and all its attachments are mounted further to the right on the camera head CH than the mounting locations of the camera C in both FIGS. 1A and 1B. In this manner, the center of gravity of the assemblage mounted on the movable platform P of the camera head CH is centered on the stationary body B of the camera head CH and over approximately the center of the tripod T, whereby there is no significant tendency for the platform P to pivot and the camera C to tilt forward or back (left or right as viewed in FIG. 1A). This balancing or centering of the weight on the camera head HC also minimizes the resistance to rotating the handles H1 and H2 of the camera head CH for tilting and panning the camera in a conventional manner. The balancing of the weight of the camera and all its attachments over the center of the camera head can be even more important when a friction or fluid type head is used which may inadvertently tilt if there is a significant weight imbalance.

However, in each of FIGS. 1A, 1B and 1C, it should be noted that the overall length of the telescopic viewfinder assembly V is different and that the distance D from the center line of the camera head CH to the position of the eye E of the person using the telescopic viewfinder assembly V is the same or substantially the same. The telescopic viewfinder V includes a conventional soft cup V1 that conforms to the cameraman's eye socket for excluding most or all of the surrounding light and the flexibility of the cup V1 allows a small amount of variation in the position of the eye E relative to the rigid portion of the telescopic viewfinder assembly V to which the soft cup V1 is attached. Also, a conventional support V4 is connected between the camera head CH and the telescopic viewfinder assembly V and is adjustable in the conventional manner for supporting the telescopic viewfinder assembly V in the desired vertical position for the cameraman during tilting of the camera C.

As diagrammatically illustrated in FIGS. 1A–1C, the telescopic viewfinder V includes at least two components V2 and V3 that are telescopically movable relative to each other for changing the overall length of the telescopic viewfinder assembly V. Those components V2 and V3 may be of any physical construction, such as round or square tubes, and are provided with any conventional means for locking the components V2 and V3 in the selected position to provide the desired overall length, but the exact construction of the components V2 and V3 and locking means is not specifically described herein because such construction does not comprise any aspect of this invention, other than to support the telescopic viewfinder optical system of this invention.

FIGS. 2A, 2B and 2C show three different telescoping positions of the telescopic viewfinder optical system, generally designated VS of the telescopic viewfinder assembly V corresponding approximately to the three positions shown in FIGS. 1A, 1B and 1C, respectively. Each lens or other glass element of the viewfinder optical system VS is identified by a numeral from 1 through 23 and the general configuration of each lens element or other glass element is depicted in the Figures but the actual radius of each lens element surface is set forth below in Tables 1 and 2, which will be describes later. The lens surfaces, including dummy optical surfaces used for optical design calculation purposes or indicating the location of an image or the like, are identified by the letter "S" followed by a numeral from S1 through S47. Coincident lens surfaces of adjacent lens elements are identified by S and a single numeral, namely, S21, S24, S36 and S37, rather than identifying coincident surfaces with two numerals. Groups of lens elements having a combined function or functions are identified by the letter "G" followed by a numeral from G1 through G6. While only the lens and other glass elements are shown in FIGS. 2A–2C and 3A–3C, it is to be understood and will readily appear to those skilled in the art that conventional mechanical mechanisms will be provided for mounting the lens elements, other glass elements and lens groups, and for causing axial movement of the lens groups in a conventional lens housing or barrel, including tubes V2 and V3 described above.

Before turning to the detailed optical design characteristics and features of the lens elements, a broad description of the lens groups, their axial positions and their relative movement will be provided for the viewfinder optical system VS of this invention. The light rays from the object in space being photographed pass through the objective lens (SO, MO or LO) of the camera C and directly or indirectly through other optical elements, to the entrance of the viewfinder assembly V in the conventional manner and then through the stop S1 at the far left of FIGS. 2A–2C and 3A–3C in the same manner for all positions of the lenses. A real image is formed on a ground glass plate 1 and the light rays pass through a field lens 2 to a prism group G1 and then through a relay system lens group G2 to a lens group G3 that forms a real image viewed through the eyepiece lens group G5 by the viewer's eye located at S46. The ground glass plate 1, field lens 2, prism group G1 and relay lens system G2 form a front module FM that remains stationary in the viewfinder optical system VS, such as being mounted in tube V2 attached to the camera C (see FIGS. 1A–1C), and the lens group G3, eyepiece lens group G5 and eye cup V1 form a rear module RM of the viewfinder optical system VS that is telescopically movable relative to the front module FM, such as by being mounted in tube V3. The telescopic movement is infinitely variable from a fully extended position shown in FIG. 2A through an intermediate position shown in FIG. 2B to a fully compressed condition shown in FIG. 2C. As will appear more fully hereinafter from Table 1, the full amount of telescopic movement is about three and one-half inches (88.9 mm) in the specific embodiment shown and described herein, although the telescopic viewfinder optical system VS of this invention can be designed to produce any desired telescoping distance within practical limits. It should be noted that the two dashed lines extending between the Figures in FIGS. 2A–2C and between FIGS. 3A–3C identify the location of the same lens elements 7 and 8, respectively, in the respective telescoping positions.

Tables 1 and 2 that are set forth below provide the optical design specifications for the telescopic viewfinder optical system VS of this invention with the basic difference between those two Tables being that Table 2 includes the magnifying lens group G4 comprised of lens elements 10–14 that are not included in Table 1 and that, as a result, the maximum aperture diameter dimensions also differ for lens elements 15 through 23 between Tables 1 and 2. In other words, Table 1 provides the lens design specification for the telescopic viewfinder optical system VS illustrated in FIGS. 2A–2C without the magnifying lens group G4 (with lens elements 10–14 shown above and below the optical axis) and Table 2 provides the lens design specifications for the telescopic viewfinder optical system VS shown in FIGS. 3A–3C with the magnifying lens group G4 positioned on the optical axis. In both Tables the first column entitled "Item" lists the lens element or other glass element identified by a numeral, or a significant location identified by a descriptive label such as "Object Plane" and the stop aperture identified by "Stop". These "Item" numbers in Tables 1 and 2 are the same as those used in the Figures of the drawings. The second column of each Table labeled "Group" identifies the groups of lens elements that perform a particular function or have a particular feature and are the same "G" numbers used in the Figures. The next column in each Table labeled "Surface" is a list of the surface numbers identified on the Figures including each surface of a lens element or other glass element, except where the lens surface of two adjacent lens elements is identical and coincident, then a single surface number is used. As viewed in the Figures, the left-hand surface of an element is listed under "Surface" on the same line as the element number (Item number) in the Tables and the right-hand surface is on the next line. The Tables also list under "Surface" the other significant locations such as the object plane S0, the location of the intermediate image S28, the plane of the exit pupil (or eye pupil) position S45, the position of a theoretically perfect eye lens S46 and the position of the human eye retina or "image plane" S47. The next two columns entitled "Extension Position" and "Separation" in each Table represents the position of each surface and its separation from the next surface for each of the telescoping positions of the telescopic viewfinder optical system, with the entry "All" meaning that the surface is in the same location for all extension positions and the entries "A", "B" and "C" meaning the three extension positions shown in FIGS. 2A, 2B and 2C for Table 1 and FIGS. 3A, 3B and 3C for Table 2, respectively. In accordance with the normal practice in lens design, the "Separation" is measured from the surface listed on that line of the Table to the next surface listed, which is to the right, as viewed in the Figures. For example, the separation from S14 to S15 is 10.000 mm, which is the thickness of the lens element 7 on the optical axis and that thickness obviously remains the same for "All" positions of the telescoping components of the system. On the other hand, the Separation or distance between the right hand surface S15 of lens element 7 to the left hand surface S16 of lens element 8 varies from 90.900 mm in position A shown in FIG. 1A to 2.000 mm in position C shown in FIG. 1C. The next column in each Table provides the "Radius of Curvature" of that Surface of the lens or glass element. The next three columns in each of the Tables identifies the material of that element by type, code and material name, and when the "material" from one surface to the next surface is air it is so identified. The last column in each Table sets forth the maximum aperture diameter of the light rays at each surface and it should be noted that such maximum aperture diameter is smaller for the surfaces to the right of the magnification lens group G4 when that group is positioned on the optical axis as set forth in Table 2.

Set forth below in Table 1 are the design specifications for the preferred embodiment of the telescopic viewfinder optical system VS of the present invention, without the magnifying lens group G4, as illustrated in detail in FIGS. 1A–1C.

TABLE 1

| Item | Group | Surface | Extension Position | Separation (mm) | Radius of Curvature (mm) | Material Type | Code | Name* | Maximum Aperture Diameter (mm) |
|---|---|---|---|---|---|---|---|---|---|
| Object Plate | | S0 | All | −55.629 | Flat | Air | | | |
| Stop | | S1 | All | 55.629 | Flat | Air | | | 14 99 |
| 1 | | S2 | All | 1.397 | Flat | Glass | 516642 | BK7 | 25.09 |
| | | S3 | All | 5.812 | Flat | Air | | | 25.71 |
| 2 | | S4 | All | 8.530 | −23.520 | Glass | 835427 | LAH55 | 26.82 |
| | | S5 | All | 12.986 | −20.164 | Air | | | 31.76 |

TABLE 1-continued

| Item | Group | Surface | Extension Position | Separation (mm) | Radius of Curvature (mm) | Material Type | Code | Name* | Maximum Aperture Diameter (mm) |
|---|---|---|---|---|---|---|---|---|---|
| 3 | G1 | S6 | All | 43.361 | Flat | Glass | 620363 | F2 | 31.28 |
|  |  | S7 | All | 0.050 | Flat | Air |  |  | 31.12 |
| 4 | G1 | S8 | All | 74.021 | Flat | Glass | 620363 | F2 | 31.12 |
|  |  | S9 | All | 12.986 | Flat | Air |  |  | 34.02 |
| 5 | G2 | S10 | All | 5.899 | 97.742 | Glass | 847239 | PBH53W | 34.95 |
|  |  | S11 | All | 3.243 | 37.998 | Air |  |  | 33.85 |
| 6 | G2 | S12 | All | 8.991 | 46.177 | Glass | 456903 | FPL52 | 35.85 |
|  |  | S13 | All | 19.724 | −88.722 | Air |  |  | 36.40 |
| 7 | G2 | S14 | All | 10.000 | −45.000 | Glass | 847239 | PBHS3W | 38.28 |
|  |  | S15 | A | 90.900 | −40.755 | Air |  |  | 42.29 |
|  |  |  | B | 44.450 |  |  |  |  |  |
|  |  |  | C | 2.000 |  |  |  |  |  |
| 8 | G3 | S16 | All | 8.909 | 76.102 | Glass | 835427 | LAH55 | 31.65 |
|  |  | S17 | All | 1.167 | 81.585 | Air |  |  | 31.17 |
| 9 | G3 | S18 | All | 2.900 | −73.495 | Glass | 805254 | PBH6W | 30.63 |
|  |  | S19 | All | 107.500 | 341.649 | Air |  |  | 30.27 |
| Intermediate Image |  | S28 | All | 3.175 | — | Air |  |  | — |
| 15 | G5 | S29 | All | 3.441 | −48.653 | Glass | 835427 | LAH55 | 24.69 |
|  |  | S30 | All | 0.500 | −29.852 | Air |  |  | 25.70 |
| 16 | G5 | S31 |  | 3.613 | 24.975 | Glass | 847239 | PBH53W | 26.43 |
|  |  | S32 | All | 6.085 | 29.896 | Air |  |  | 25.14 |
| 17 | G5 | S33 | All | 2.000 | −41.020 | Glass | 667331 | PBM39 | 24.93 |
|  |  | S34 | All | 5.903 | 35.026 | Air |  |  | 26.01 |
| 18 | G5 | S35 | All | 8.858 | 124.014 | Glass | 804466 | LAH65 | 30.38 |
| 19 | G5 | S36 | All | 2.800 | −26.610 | Glass | 785262 | PBH23W | 31.45 |
| 20 | G5 | S37 | All | 11.673 | 43.306 | Glass | 804466 | LAH65 | 35.91 |
|  |  | S38 | All | 0.500 | −44.247 | Air |  |  | 37.25 |
| 21 | G5 | S39 | All | 7.922 | 33.104 | Glass | 804466 | LAH65 | 36.49 |
|  |  | S40 | All | 2.600 | 145.855 | Air |  |  | 34.41 |
| 22 | G5 | S41 | All | 3.383 | 15.444 | Glass | 847239 | PBH53W | 26.19 |
|  |  | S42 | All | 8.941 | 12.395 | Air |  |  | 21.74 |
| 23 | GS | S43 | All | 1.397 | Flat | Glass | 516642 | BK7 | 19.83 |
|  |  | S44 | A | 16.750 | Flat | Air |  |  | 19.16 |
|  |  |  | B | 19.496 |  |  |  |  |  |
|  |  |  | G | 22.243 |  |  |  |  |  |
| Eye Pupil Position |  | S45 | All | 0.0 | — | — | — | — | — |
| Perfect Eye Lens** |  | S46 | All | 22.500 | — | — | — | — | — |
| Image Plane*** |  | S47 | All | — | Flat | — | — | — | — |

NOTES:
*All material name designations are for Ohara glasses except for BK7 (Items 1 and 23) and F2 (Items 3 and 4) which are for Schott glasses.
**Surface S46 emulates a perfect eye lens of focal length 22.5 mm which produces no residual optical aberrations including field curvature, hence the flat image plane.
***Flat image plane is equivalent to the retina of a human eye. Maximum object height is 10.54 mm (X axis) and 6.80 mm (Y axis).

Set forth below in Table 2 are the design specifications for the preferred embodiment of the telescopic viewfinder optical system VS of the present invention, with the magnification lens group G4, as illustrated in detail in FIGS. 3A–3C.

TABLE 2

| Item | Group | Surface | Extension Position | Separation (mm) | Radius of Curvature (mm) | Material Type | Code | Name* | Maximum Aperture Diameter (mm) |
|---|---|---|---|---|---|---|---|---|---|
| Object Plane |  | S0 | All | −55.629 | Flat | Air |  |  |  |
| Stop |  | S1 | All | 55.629 | Flat | Air |  |  | 14.99 |
| 1 |  | S2 | All | 1.397 | Flat | Glass | 516642 | BK7 | 25.09 |
|  |  | S3 | All | 5.812 | Flat | Air |  |  | 25.71 |

TABLE 2-continued

| Item | Group | Surface | Extension Position | Separation (mm) | Radius of Curvature (mm) | Material Type | Material Code | Material Name* | Maximum Aperture Diameter (mm) |
|---|---|---|---|---|---|---|---|---|---|
| 2 | | S4 | All | 8.530 | −23.520 | Glass | 835427 | LAH55 | 26.82 |
| | | S5 | All | 12.986 | −20.164 | Air | | | 31.76 |
| 3 | G1 | S6 | All | 43.361 | Flat | Glass | 620363 | F2 | 31.28 |
| | | S7 | All | 0.050 | Flat | Air | | | 31.12 |
| 4 | G1 | S8 | All | 74.021 | Flat | Glass | 620363 | F2 | 31.12 |
| | | S9 | All | 12.986 | Flat | Air | | | 34.02 |
| 5 | G2 | S10 | All | 5.899 | 97.742 | Glass | 847239 | PBHS3W | 34.95 |
| | | S11 | All | 3.243 | 37.998 | Air | | | 33.85 |
| 6 | G2 | S12 | All | 8.991 | 46.177 | Glass | 456903 | FPL52 | 35.85 |
| | | S13 | All | 19.724 | −88.722 | Air | | | 36.40 |
| 7 | G2 | S14 | All | 10.000 | −45.000 | Glass | 847239 | PBHS3W | 38.28 |
| | | S15 | A | 90.900 | −40.755 | Air | | | 42.29 |
| | | | B | 44.450 | | | | | |
| | | | C | 2.000 | | | | | |
| 8 | G3 | S16 | All | 8.909 | 76.102 | Glass | 835427 | LAH55 | 31.65 |
| | | S17 | All | 1.167 | 81.585 | Air | | | 31.17 |
| 9 | G3 | S18 | All | 2.900 | −73.495 | Glass | 805254 | PBH6W | 30.63 |
| | | S19 | All | 31.868 | 341.649 | Air | | | 30.27 |
| 10 | G4 | S20 | All | 5.594 | 21.750 | Glass | 571530 | BAL3 | 21.81 |
| 11 | G4 | S21 | All | 2.150 | 107.722 | Glass | 654397 | BPH5 | 20.23 |
| | | S22 | All | 33.500 | 23.723 | Air | | | 18.51 |
| 12 | G4 | S23 | All | 1.500 | −16.611 | Glass | 835427 | LAH55 | 11.11 |
| 13 | G4 | S24 | All | 3.238 | 10.001 | Glass | 755275 | PBH4W | 12.05 |
| | | S25 | All | 22.226 | −122.804 | Air | | | 12.37 |
| 14 | G4 | S26 | All | 4.424 | −18.745 | Glass | 456903 | FPL52 | 21.26 |
| | | S27 | All | 3.000 | −15.214 | Air | | | 23.05 |
| Intermediate Image | | S28 | All | 3.175 | — | Air | | | |
| 15 | G5 | S29 | All | 3.441 | −48.653 | Glass | 835427 | LAH55 | 25.02 |
| | | S30 | All | 0.500 | −29.852 | Air | | | 25.99 |
| 16 | G5 | S31 | All | 3.613 | 24.975 | Glass | 847239 | PBH53W | 26.48 |
| | | S32 | All | 6.085 | 29.896 | Air | | | 25.14 |
| 17 | G5 | S33 | All | 2.000 | −41.020 | Glass | 667331 | PBM39 | 24.88 |
| | | S34 | All | 5.903 | 35.026 | Air | | | 25.80 |
| 18 | G5 | S35 | All | 8.858 | 124.014 | Glass | 804466 | LAH65 | 29.84 |
| 19 | G5 | S36 | All | 2.800 | −26.610 | Glass | 785262 | PBH23W | 30.91 |
| 20 | G5 | S37 | All | 11.673 | 43.306 | Glass | 804466 | LAH65 | 34.86 |
| | | S38 | All | 0.500 | −44.247 | Air | | | 36.24 |
| 21 | G5 | S39 | All | 7.922 | 33.104 | Glass | 804466 | LAH65 | 35.21 |
| | | S40 | All | 2.600 | 145.855 | Air | | | 32.95 |
| 22 | G5 | S41 | All | 3.383 | 15.444 | Glass | 847239 | PBH53W | 25.29 |
| | | S42 | All | 8.941 | 12.395 | Air | | | 21.00 |
| 23 | G5 | S43 | All | 1.397 | Flat | Glass | 516642 | BK7 | 18.52 |
| | | S44 | A | 16.750 | Flat | Air | | | 17.82 |
| | | | B | 19.496 | | | | | |
| | | | C | 22.243 | | | | | |
| Eye Pupil Position | | S45 | All | 0.0 | — | — | — | — | — |
| Perfect Eye Lens** | | S46 | All | 22.500 | — | — | — | — | — |
| Image Plane*** | | S47 | All | — | Flat | — | — | — | — |

NOTES:
*All material name designations are for Ohara glasses except for BK7 (Items 1 and 23) and F2 (Items 3 and 4) which are for Schott glasses.
**Surface S46 emulates a perfect eye lens of focal length 22.5 mm which produces no residual optical aberrations including field curvature, hence the flat image plane.
***Flat image plane is equivalent to the retina of a human eye. Maximum object height is 10.54 mm (X axis) and 6.80 mm (Y axis).

The magnification lens group G4 comprising lens elements 10–14 produces, at the intermediate image location S28, a double magnification of the normal image provided without the magnification lens group G4, which double magnification is very useful for enhancing the focus adjustment by the cameraman of the objective lens SO, MO or LO of the camera C, although it also allows the cameraman to inspect an object in space more carefully to observe details or flaws that might not be readily apparent without such magnification. With the double magnification, the area viewed in the viewfinder V is smaller than the framed scene that will be filmed by the camera C but, as will become more apparent from the remaining figures of the drawings and the description below, the focus and quality of the image viewed is not changed when the magnification lens group G4 is moved into the optical path. Such movement can be caused by any conventional means, such as pivotal mounting of the lens elements 10–14 and, as shown in the drawings, lens elements 10 and 11 are pivoted separately from lens elements 12 and 13 which are pivoted separately from lens element 14. Although only one magnification lens group G4 is shown and specified, additional magnification lens groups may be provided in the telescopic viewfinder system of this invention.

Referring now to FIGS. 4A–4E through FIGS. 9A–9E, each of these Figures comprises a ray aberration graph for the telescopic viewfinder optical system of this invention as shown in FIGS. 2A–2C and 3A–3C, and set forth in Tables 1 and 2. FIGS. 4A–4E, 5A–5E and 6A–6E are the ray aberration graphs for the three positions shown in FIGS. 2A, 2B and 2C, respectively, without the magnification lens group G4. FIGS. 7A–7E, 8A–8E and 9A–9E are the ray aberration graphs for the three positions shown in FIGS. 3A, 3B and 3C, respectively, with the magnification lens group G4. Each of the five ray aberration graphs having the same FIG. numeral, for example, FIGS. 4A–4E, is for five different positions across the field of view of the viewfinder V at the exit pupil or eye pupil position S45. Specifically, the "A" figure, such as FIG. 4A, of each set of ray aberration graphs is at the corner of the viewable picture, which corner is represented by an angle of 10.7° along the horizontal or "X" axis and 6.95° along the vertical or "Y" axis, as shown in parentheses in the center of FIG. 4A. The two values "1.00" above the legend "Relative Field" in FIG. 4A represent the distances on the X and Y axes from the center or optical axis and in this specific example the maximum distance on the X axis is 10.54 mm and the maximum distance on the Y axis is 6.80, which maximum distances form the denominator for the fraction represented by the actual distance over the maximum distance that therefore is "1.00" in FIG. 4A. The "B" Figure of each set of ray aberration graphs, such as FIG. 4B, represents the maximum distance from the center along the X axis (1.00 and 10.7°) and the center or zero distance along the Y axis (0.00 and 0.00°). Similarly the "C" Figure of each set of five ray aberration graphs represents the position at the center on the X axis (0.00 and 0.00°) and the maximum distance on the Y axis (1.00 and 6.98°). Similarly, the "D" Figure of each set of five ray aberration graphs represents a position at the center on the X axis (0.00 and 0.00°) and approximately one-half of the maximum distance along the Y axis (0.48 and 3.38°). Finally, the "E" Figure of each set of five ray aberration graphs represents the position on the optical axis at a zero distance along both the X and Y axes (0.00 and 0.00° for both X and Y). It should be noted that the five positions for the five ray aberration graphs FIGS. 7A–7E through 9A–9E are measured in the same manner along the X and Y axes between zero and maximum but that due to the double magnification in the optical system represented by those Figures, the angles represented by the degrees in parenthesis on the Figures are approximately one-half of the degrees set forth in FIGS. 4A–4E through 6A–6E. In each of the ray aberration graphs, the aberration with respect to each of five different light wave lengths (450.0 nm, 486.1 nm, 546.1 nm, 587.6 nm and 643.8 nm) is plotted with a different type of broken line, as shown at the bottom of each sheet of drawings FIGS. 4A–4E through 9A–9E. The ray aberration graphs FIGS. 4A–4E through 9A–9E are produced by CODE V® optical design software that is commercially available from Optical Research Associates, Inc., Pasadena, Calif., U.S.A., based on the optical design specification set forth in Tables 1 and 2. As will readily appear to those skilled in the art, these ray aberration graphs establish that there is a very small residual aberration for each of the five locations for each of the six positions FIGS. 2A, 2B, 2C, 3A, 3B, 3C of the telescopic viewfinder V, whereby a very high quality image is produced for viewing by the cameraman.

In the telescopic viewfinder optical system VS, as defined by Tables 1 and 2, the maximum axial field beam diameter at the eye pupil position S45 is 8.54 mm for the normal or low magnification, i.e. FIGS. 2A–2C and Table 1, and 4.26 mm for the high magnification, i.e. FIGS. 3A–3C and Table 2. This provides a very large range of acceptable lateral or vertical movement of the human eye relative to the viewfinder without an appreciable is loss of image viewing quality, and is substantially greater than most viewfinders.

Figures 11A, 11B:
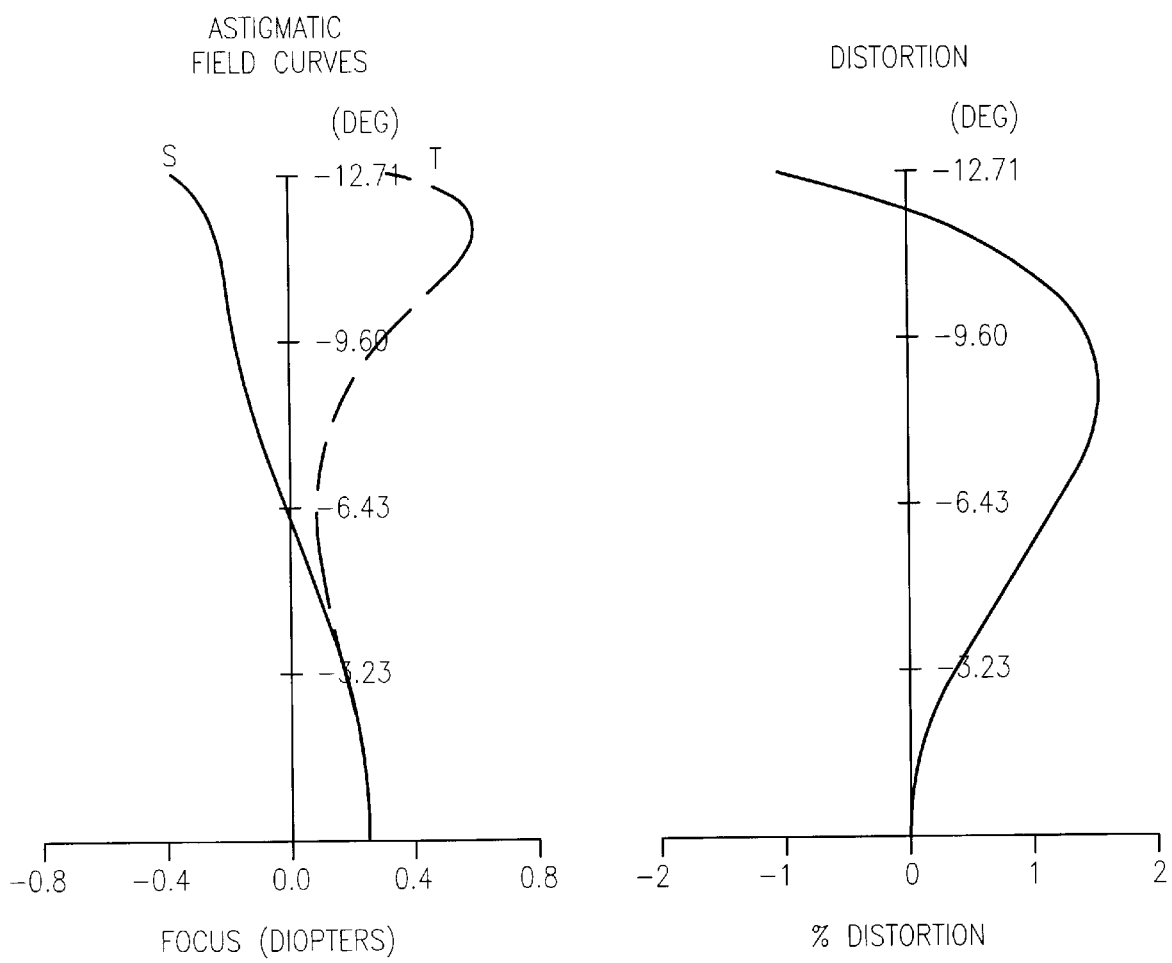
FIGS. 11A and 11B are graphs of the astigmatism and distortion characteristics, respectively, for the telescopic viewfinder optical system of this invention in the position shown in FIG. 2B.
Figures 12A, 12B:
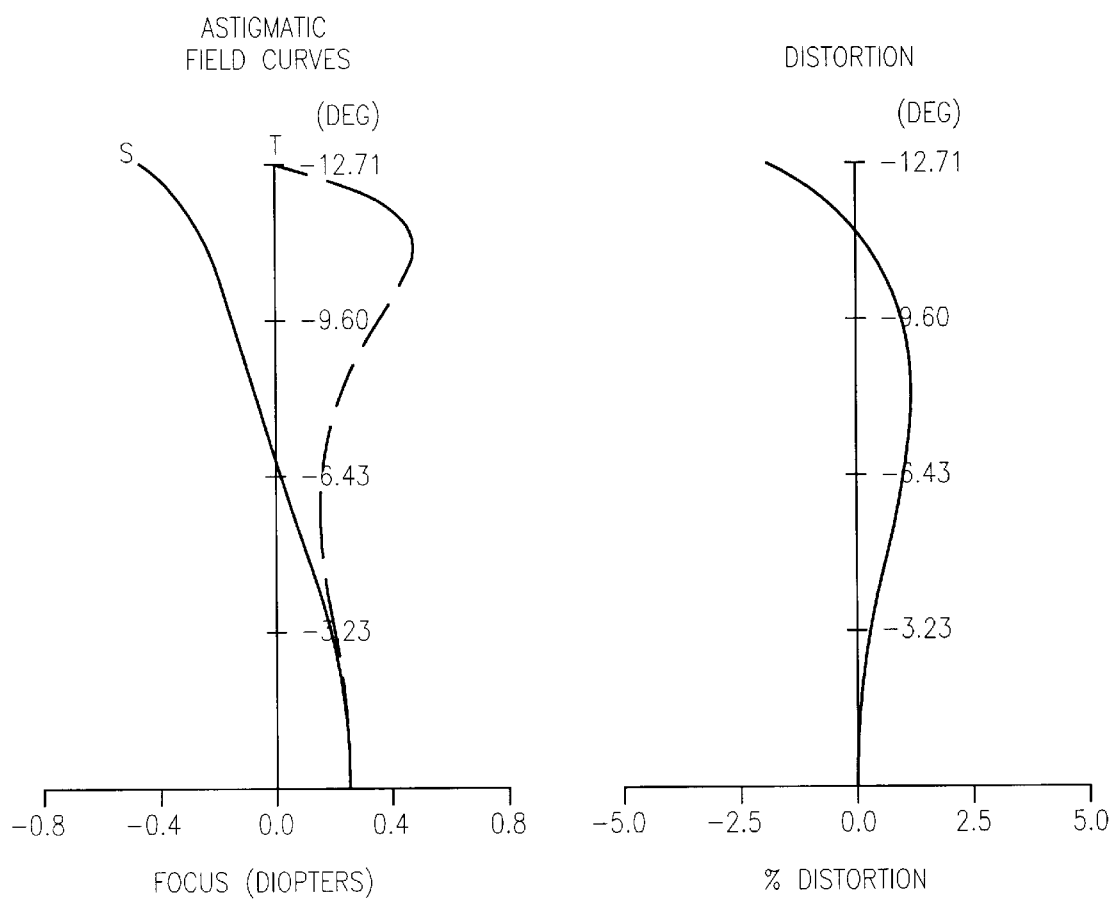
FIGS. 12A and 12B are graphs of the astigmatism and distortion characteristics, respectively, for the telescopic viewfinder optical system of this invention in the position shown in FIG. 2C.
Figures 15A, 15B:
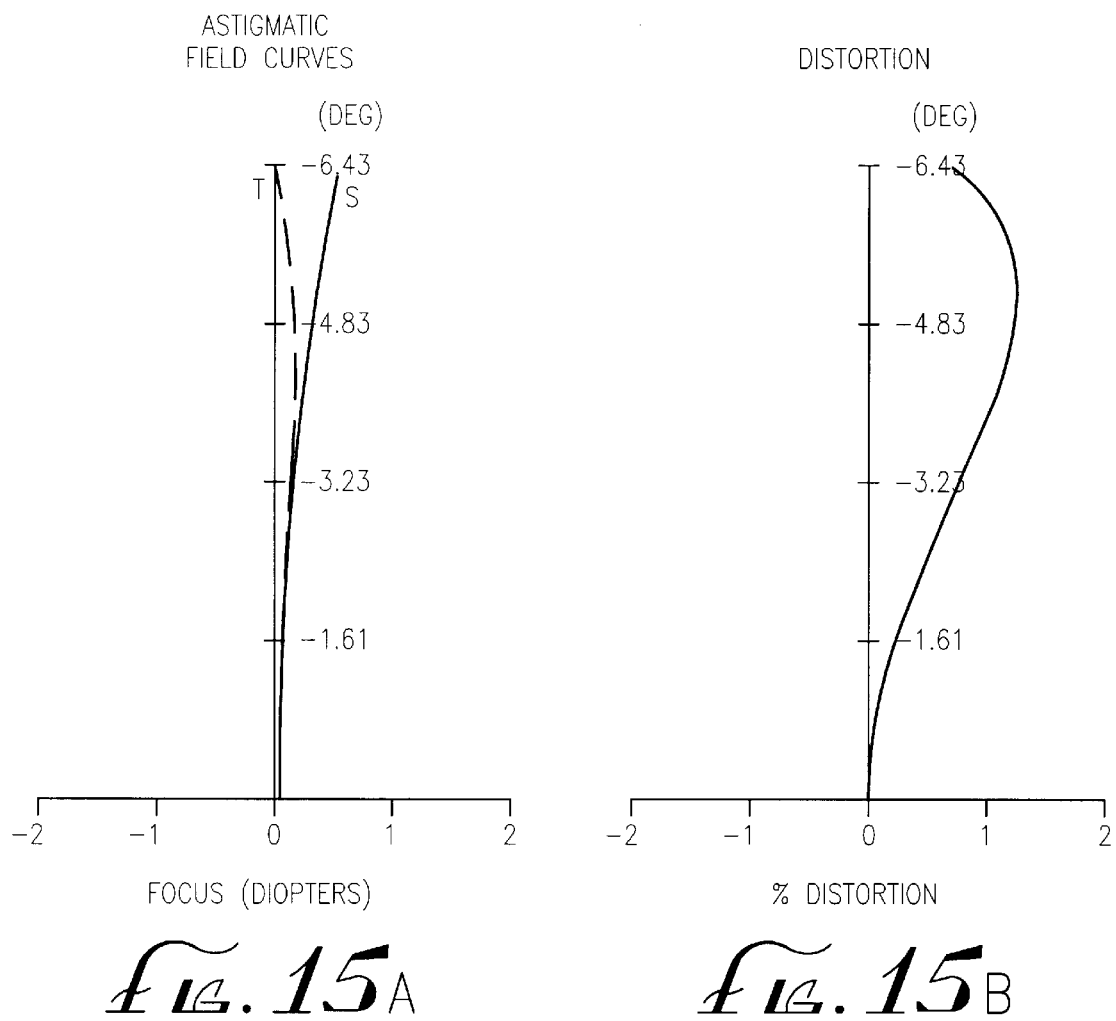
FIGS. 15A and 15B are graphs of the astigmatism and distortion characteristics, respectively, for the telescopic viewfinder optical system of this invention in the position shown in FIG. 3C.

Referring now to FIGS. 10A through 15B, graphs are illustrated for each of the six positions of the telescopic viewfinder optical system shown in the six FIGS. 2A, 2B, 2C, 3A, 3B and 3C. Each "A" Figure, such as FIG. 10A, illustrates the astigmatic field curves with the solid line "S" representing sagittal and the dashed line "T" representing tangential. The vertical dimension in each "A" figure is in degrees from the optical axis with 12.71° at the top representing the maximum spacing from the optical axis corresponding to the corner of the image, similar to the position represented by the "A" Figures of the ray aberration graphs described above. In other words, 12.71° represents a distance of 10.54 mm on the X axis and 6.80 mm on the Y axis, whereby the actual distance from the central (optical) axis is the square root of 10.54 squared plus 6.80 squared, namely, 12.543 mm. Each of the "B" Figures of FIGS. 10B–15B represents the percent distortion at distances from the optical axis as measured by degrees, with the furthest distance being at the top, the same as the "A" FIGS. 10A–15A. While vertical graph lines at 0.0 Diopters for focus in the "A" FIGS. 10A–15A and 0.0 percent distortion in the "B" FIGS. 10B–15B, would represent perfect quality, it will readily appear to those skilled in the art that the magnitude of departure of the curves from the vertical central line in FIGS. 10A–15B is relatively small whereby a very good viewing system results. Again, the graphs forming FIGS. 10A through 15B were produced by CODE V® optical design software of Optical Research Associates, Inc., Pasadena, Calif., U.S.A., based on the optical design specifications set forth in Tables 1 and 2. All of the data in Tables 1 and 2 and all of graphs, and curves shown in FIGS. 4A–E through 15A–B are given at a temperature of 20° C. (68° F.) and standard atmospheric pressure (760 mmHg).

In the telescopic viewfinder optical system VS of this invention, the front module FM comprised of lens elements 1 and 2, lens group G1 and lens group G2 is relatively weakly powered. The lens group G1 formed by elements 3 and 4 is a Pechan prism which effectively extends the optical axis as diagrammatically shown in FIGS. 2A–3C, and the Pechan prism has a zero optical power, i.e., infinite focal length. Similarly, the lens group G3 that forms the intermediate image at S28 is weakly powered. Further, the light rays in the space between surfaces S15 and S16 (where the relative movement between tubes V2 and V3 occurs) are collimated which also assists in avoiding focus and magnification changes upon telescoping movement. Therefore, the telescoping movement of the rear module RM relative to the front module FM causes only a minimum amount of movement of the ideal eye pupil position S45, which can be accommodated by the cameraman merely pressing harder or softer on the resilient eye cup V1. For example, a conventional soft eye cup V1 allows approximately 10 mm of comfortable axial movement of the eye relative to the viewfinder for easily accommodating the small change in focus position S45, i.e. the eye pupil position. This combination of weakly powered lens groups, the collimated light rays and the Pechan prism are factors that allow the telescopic movement without noticeable change in focus or magnification, i.e. size of the viewed image, and only a slight movement of the eye pupil position.

The eyepiece lens group G5 is comprised of lens elements 15–23, of which lens elements 18–21 form a focus lens group G6 that is adjustably moveable by a small amount relative to the remaining lens elements 15, 16, 17, 22 and 23 to provide an eye focus range from minus 5.3 to plus 4.2 Diopters from the nominal design location. By this adjustable movement, the focus lens group G6 can compensate for variations from the normal or ideal human eye, i.e. can accommodate a wide range of near-sightedness and far-sightedness. The adjustment of this lens group G6 (lens elements 18–21) causes the separation from surface S44 to the eye pupil position S45 to change which, in effect, compensates for the different distances in the human eye between the eye pupil position S45 and the eye retina (image plane) S47. Since the eye compensating focus lens group GE moves internally of the eyepiece lens group G5, the distance D (see FIGS. 1A–1C) between the center of the camera head CH and the eye E of the cameraman does not change when adjustments are made for compensating for the human eye variations. Only the separation to the right of surface S34 and to the right of surface S40 varies. Specifically, for the maximum compensation for near-sightedness of minus 5.3 Diopters, the separation at surface S34 equals 2.803 mm and the separation at surface S40 equals 5.700 mm, rather than the separations of 5.903 mm and 2.600 mm shown on Tables 1 and 2 for the perfect or normal eye. For the maximum adjustment for far-sightedness of plus 4.2 Diopters, the separation at surface S34 is 8.003 mm and the separation at surface S40 is 0.500 mm.

Another important feature of this invention that is provided by the Pechan prism G1 or an equivalent zero optical power lens element, such as a roof edge Pechan prism, is the ability to properly orient the image for viewing at the eye cup V1. Since the telescopic viewfinder assembly V is attached to a film camera, video camera or the like that contains other optical systems that produce the image at image plane SO, such camera optical systems may cause the image to be inverted from top to bottom, left to right, or both and the Pechan prism G1 may be properly positioned for correctly orienting the image for viewing by the human eye without altering the optical axis or otherwise affecting the image quality or magnification.

While the telescopic viewfinder optical system VS of this invention has been described in connection with a specific embodiment and specific details have been provided in Tables 1 and 2 for that embodiment, it is to be understood and will readily appear to those skilled in the art that variations in the specifications may be made while retaining the same or similar features and without departing from the invention as defined by the accompanying claims. For example, without limitation, the front module FM and the rear module RM may be made of lengths that are different from the specifications in the Tables and the length of telescoping may be changed. Further, one or more of the specific lens elements may be changed without substantially changing the optical effect, such as substituting a single lens for the eyepiece lens group G5, although all of the same advantages may not be obtained. Further, while the telescoping lens assembly V has been described as having the advantage of maintaining the same distance D from a camera head CH to the cameraman's eye E when various sizes of objective lenses are used on a camera C, as shown in FIGS. 1A, 1B and 1C, there may be other advantageous uses and features of the telescopic viewfinder optical system VS of this invention.

What is claimed:

1. A telescopic viewfinder optical system for a camera having interchangeable objective lenses, the system comprising:

a front lens group aligned on an optical axis for receiving and relaying an image received indirectly from the camera objective lens to an exit of said first lens group, said front lens group producing collimated light rays of the image at said exit;

a rear lens group aligned on the optical axis for receiving the collimated light rays of the image from said front lens group and producing a real image within said second lens group, said rear lens group including an eyepiece lens group for viewing the real image; and said rear lens group being telescopically movable on the optical axis relative to said front lens group with said real image remaining in focus as viewed through said eyepiece lens means throughout the telescopic relative movement of said front and rear lens groups.

2. The telescopic viewfinder optical system of claim 1, wherein said front lens group includes a weakly powered lens subgroup for producing the collimated light rays of the image at said exit.

3. The telescopic viewfinder optical system of claim 1, wherein said rear lens group includes a weakly powered lens subgroup for receiving the collimated light rays of the image from said exit and producing the real image.

4. The telescopic viewfinder optical system of claim 2, wherein said rear lens group includes a weakly powered lens subgroup for receiving the collimated light rays of the image from said exit and producing the real image.

5. The telescopic viewfinder optical system of claim 1, further including a magnification lens group movable from a first position spaced from the optical axis to a second position on the optical axis for changing the magnification of the real image.

6. The telescopic viewfinder optical system of claim 5, wherein said magnification lens group substantially doubles the size of the image viewed as the real image.

7. The telescopic viewfinder optical system of claim 5, wherein said magnification lens group is located in said rear lens group in said second position.

8. The telescopic viewfinder optical system of claim 2, further including a magnification lens group movable from a first position spaced from the optical axis to a second position on the optical axis for changing the magnification of the real image.

9. The telescopic viewfinder optical system of claim 3, further including a magnification lens group movable from a first position spaced from the optical axis to a second position on the optical axis for changing the magnification of the real image.

10. The telescopic viewfinder optical system of claim 1, wherein said eyepiece lens group includes an eye focus lens group that is selectively movable relative to the location of the real image for accommodating various human eye conditions of persons viewing the real image.

11. The telescopic viewfinder optical system of claim 1, wherein said front lens group includes a zero optical power prism for extending the effective optical length of the optical axis and reducing the physical length of the optical system.

12. The telescopic viewfinder optical system of claim 11, wherein said front lens group includes a weakly powered lens subgroup for producing the collimated light rays of the image at said exit.

13. The telescopic viewfinder optical system of claim 11, wherein said rear lens group includes a weakly powered lens subgroup for receiving the collimated light rays of the image from said exit and producing the real image.

14. The telescopic viewfinder optical system of claim 12, wherein said rear lens group includes a weakly powered lens subgroup for receiving the collimated light rays of the image from said exit and producing the real image.

15. The telescopic viewfinder optical system of claim 11, further including a magnification lens group movable from a first position spaced from the optical axis to a second position on the optical axis for changing the magnification of the real image.

16. The telescopic viewfinder optical system of claim 15, wherein said magnification lens group substantially doubles the size of the image viewed as the real image.

17. The telescopic viewfinder optical system of claim 15, wherein said magnification lens group is located in said rear lens group in said second position.

18. The telescopic viewfinder optical system of claim 12, further including a magnification lens group movable from a first position spaced from the optical axis to a second position on the optical axis for changing the magnification of the real image.

19. The telescopic viewfinder optical system of claim 13, further including a magnification lens group movable from a first position spaced from the optical axis to a second position on the optical axis for changing the magnification of the real image.

20. The telescopic viewfinder optical system of claim 11, wherein said rear lens group includes an eye focus lens group that is selectively movable relative to the location of the real image for accommodating various human eye conditions of persons viewing the real image.

21. A telescopic viewfinder optical system for a camera having interchangeable objective lenses, the system comprising:

a front lens group aligned on an optical axis for receiving and relaying an image received indirectly from the camera objective lens to an exit of said first lens group, said front lens group having a zero optical power prism for extending the effective length of the optical axis, said front lens group being weakly powered and producing collimated light rays of the image at said exit;

a rear lens group aligned on the optical axis for receiving the collimated light rays of the image from said front lens group and producing a real image within said rear lens group, said second lens group being weakly powered and including an eyepiece lens group for viewing the real image;

said eyepiece lens group including an eye focus lens group that is selectively movable for compensating for variations in the human eye of persons viewing the intermediate image; and said rear lens group being telescopically movable on the optical axis relative to said front lens group with said real image remaining in focus as viewed through said eyepiece lens means throughout the telescopic relative movement of said front and rear lens groups.

22. The telescopic viewfinder optical system of claim 21, wherein said prism is a roof edge Pechan prism mounted for selective adjustment to orient the real image in the correct orientation for viewing.

23. The telescopic viewfinder optical system of claim 21, further including a magnification lens group movable from a first position spaced from the optical axis to a second position on the optical axis for changing the magnification of the real image.

24. The telescopic viewfinder optical system of claim 23, wherein said magnification lens group substantially doubles the size of the image viewed as the real image.

25. The telescopic viewfinder optical system of claim 5, wherein said magnification lens group is located in said rear lens group.

26. The telescopic viewfinder optical system of claim 22, further including a magnification lens group movable from a first position spaced from the optical axis to a second position on the optical axis for changing the magnification of the real image.

27. A telescopic viewfinder optical system for a camera having interchangeable objective lenses, the system comprising:

a front lens group aligned on an optical axis for receiving and relaying an image received indirectly from the camera objective lens to an exit of said first lens group;

a rear lens group aligned on the optical axis for receiving the light rays of the image from said front lens group and producing an intermediate real image within said rear lens group;

said rear lens group being telescopically movable on the optical axis relative to said front lens group with said real image remaining substantially in focus and constant magnification throughout the telescopic relative movement of said front and rear lens groups; and said front lens group comprised of items 1 through 7 and said rear lens group comprised of items 8, 9 and 15 through 23 set forth in the following table wherein the Object Plane item is the location of formation of a real image from the camera, the Stop item is the location of the entrance stop, the Intermediate Image item is the location of said intermediate real image, the Eye Pupil Position is the location of the exit pupil for viewing said intermediate real image, the Surface column identifies the surfaces of the items, the Separation column sets forth the distance from one surface to the next surface, the Radius of Curvature column sets forth the radius of that surface, the Material Type column identifies the material between that surface and the next surface, and the Maximum Aperture Diameter column sets forth the maximum diametric dimension of the light rays passing through that surface:

| Item | Surface | Separation (mm) | Radius of Curvature (mm) | Material Type | Maximum Aperture Diameter (mm) |
|---|---|---|---|---|---|
| Object Plane | S0 | −55.629 | Flat | Air | |
| Stop | S1 | 55.629 | Flat | Air | 14.99 |
| 1 | S2 | 1.397 | Flat | Glass | 25.09 |
|  | S3 | 5.812 | Flat | Air | 25.71 |
| 2 | S4 | 8.530 | −23.520 | Glass | 26.82 |
|  | S5 | 12.986 | −20.164 | Air | 31.76 |
| 3 | S6 | 43.361 | Flat | Glass | 31.28 |
|  | S7 | 0.050 | Flat | Air | 31.12 |
| 4 | S8 | 74.021 | Flat | Glass | 31.12 |
|  | S9 | 12.986 | Flat | Air | 34.02 |
| 5 | S10 | 5.899 | 97.742 | Glass | 34.95 |
|  | S11 | 3.243 | 37.998 | Air | 33.85 |
| 6 | S12 | 8.991 | 46.177 | Glass | 35.85 |
|  | S13 | 19.724 | −88.722 | Air | 36.40 |
| 7 | S14 | 10.000 | −45.000 | Glass | 38.28 |
|  | S15 | 90.900 to 2.000 | −40.755 | Air | 42.29 |
| 8 | S16 | 8.909 | 76.102 | Glass | 31.65 |
|  | S17 | 1.167 | 81.585 | Air | 31.17 |

-continued

| Item | Surface | Separation (mm) | Radius of Curvature (mm) | Material Type | Maximum Aperture Diameter (mm) |
|---|---|---|---|---|---|
| 9 | S18 | 2.900 | −73.495 | Glass | 30.63 |
|   | S19 | 107.500 | 341.649 | Air | 30.27 |
| Intermediate Image | S28 | 3.175 | — | Air | — |
| 15 | 529 | 3.441 | −48.653 | Glass | 24.69 |
|    | 530 | 0.500 | −29.852 | Air | 25.70 |
| 16 | S31 | 3.613 | 24.975 | Glass | 26.43 |
|    | S32 | 6.085 | 29.896 | Air | 25.14 |
| 17 | S33 | 2.000 | −41.020 | Glass | 24.93 |
|    | S34 | 5.903 | 35.026 | Air | 26.01 |
| 18 | S35 | 8.858 | 124.014 | Glass | 30.38 |
| 19 | S36 | 2.800 | −26.610 | Glass | 31.45 |
| 20 | S37 | 11.673 | 43.306 | Glass | 35.91 |
|    | S38 | 0.500 | −44.247 | Air | 37.25 |

-continued

| Item | Surface | Separation (mm) | Radius of Curvature (mm) | Material Type | Maximum Aperture Diameter (mm) |
|---|---|---|---|---|---|
| 21 | S39 | 7.922 | 33.104 | Glass | 36.49 |
|    | S40 | 2.600 | 145.855 | Air | 34.41 |
| 22 | S41 | 3.383 | 15.444 | Glass | 26.19 |
|    | S42 | 8.941 | 12.395 | Air | 21.74 |
| 23 | S43 | 1.397 | Flat | Glass | 19.83 |
|    | S44 | 16.750 to22.243 | Flat | Air | 19.16 |
| Eye Pupil Position | S45 | 0.0 | — | — | — |

* * * * *

UNITED STATES PATENT AND TRADEMARK OFFICE
CERTIFICATE OF CORRECTION

PATENT NO. : 5,920,426
DATED : July 6, 1999
INVENTOR(S) : Iain A. Neil

It is certified that error appears in the above-identified patent and that said Letters Patent is hereby corrected as shown below:

Column 14,
Line 9, delete "first" and substitute -- front --.
Line 15, delete "second" and substitute -- rear --.

Column 15,
Line 39, delete "first" and substitute -- front --.
Line 47, delete "second" and substitute -- rear --.

Column 16,
Line 17, delete "first" and substitute -- front --.

Signed and Sealed this

Second Day of October, 2001

Attest:

NICHOLAS P. GODICI
Attesting Officer   Acting Director of the United States Patent and Trademark Office